United States Patent

[11] 3,595,059

| | | | |
|---|---|---|---|
| [72] | Inventor | George H. Erb | |
| | | Cuttingsville, Vt. | |
| [21] | Appl. No. | 840,772 | |
| [22] | Filed | July 10, 1969 | |
| [45] | Patented | July 27, 1971 | |
| [73] | Assignee | American Velcro Inc. | |
| | | Manchester, N.H. | |

[54] METHOD FOR SHAPING PRODUCTS MADE OF FOAM METAL BY PROGRESSIVE LOCALIZED CRUSHING OF FOAM STRUCTURE
8 Claims, 25 Drawing Figs.

[52] U.S. Cl............................................. 72/362,
72/469, 72/700, 76/101 R
[51] Int. Cl............................................. B21d 17/00
[50] Field of Search.................................... 72/362,
379, 469, 700; 125/3; 51/141; 18/4 B; 76/101 R

[56] References Cited
UNITED STATES PATENTS
| | | | |
|---|---|---|---|
| 1,496,522 | 6/1924 | Canning.................. | 51/34 |
| 2,420,637 | 5/1947 | Dykoski................. | 76/101 X |
| 2,699,077 | 1/1955 | Bedker................... | 76/101 |
| 2,723,505 | 11/1955 | Krafft..................... | 51/141 X |

*Primary Examiner*—William S. Lawson
*Attorney*—James D. Bock

ABSTRACT: Method of shaping foam metal products to provide accurate fit of such products with surfaces such as ribbed or grooved surfaces of a rigid body of metal, glass, plastic and the like by crushing surface regions of a foam metal blank against the surface to which product is to fit. Crushing operation is carried out by progressively pressing blank against surface, with relative movement between blank and surface in direction of length of ribs or grooves, until, under combined effect of pressure and friction, surface regions of the blank permanently assume shape of surface. Relative movement and heat of friction imparts desirable burnishing and densification of the crushed surface regions of the foam metal product. Method provides low cost procedure for producing scrapers, doctor blades, walls or partitions which must accurately fit against a grooved or ribbed surface even though such surface has irregularly spaced grooves or ribs of nonuniform depth or height.

PATENTED JUL27 1971  3,595,059
SHEET 1 OF 4
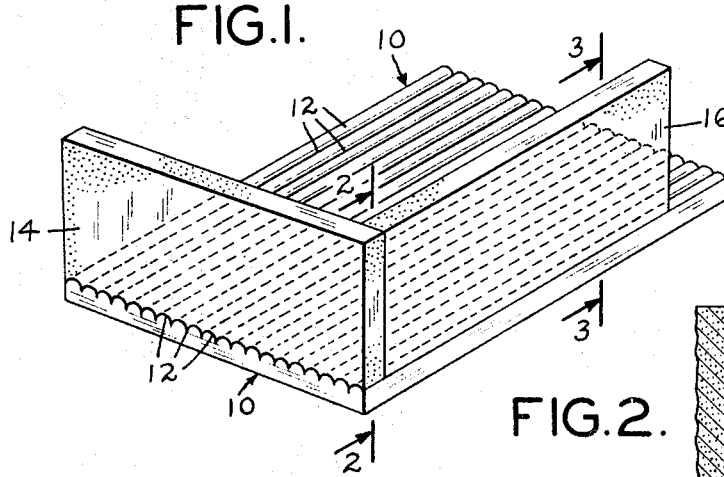
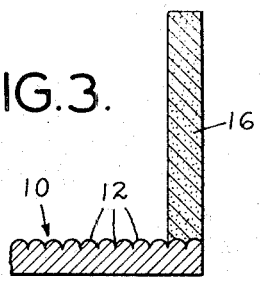
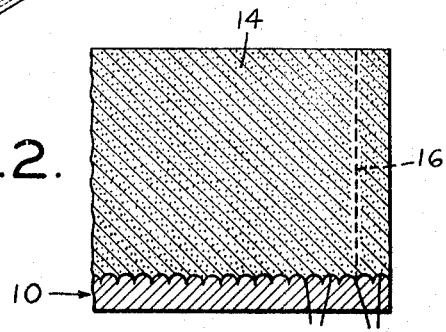
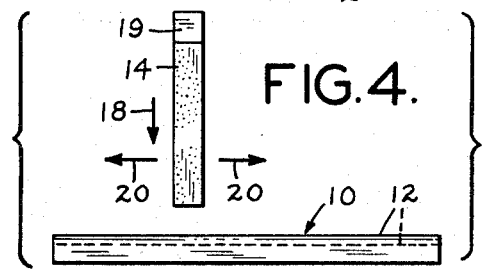
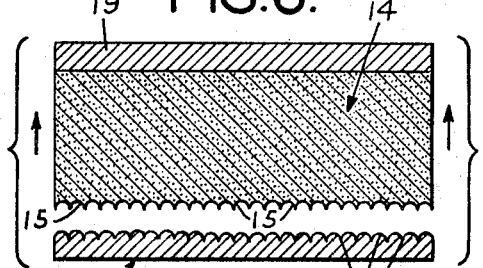
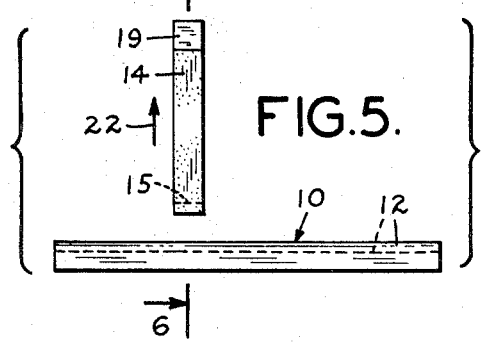
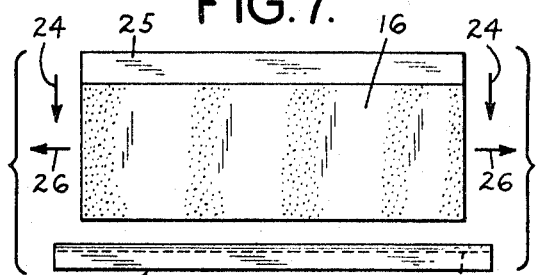
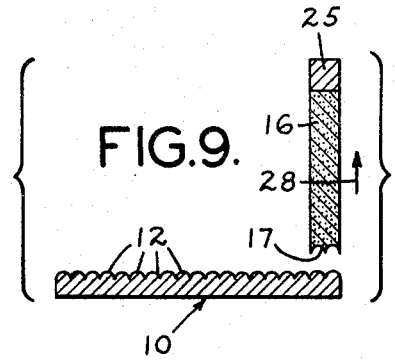
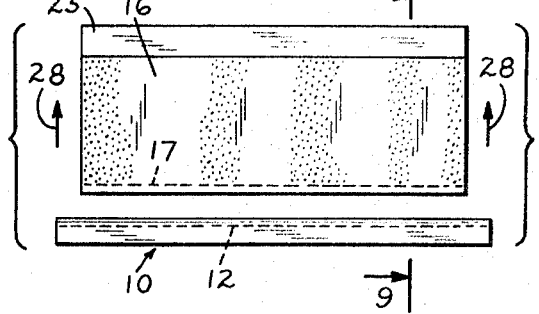

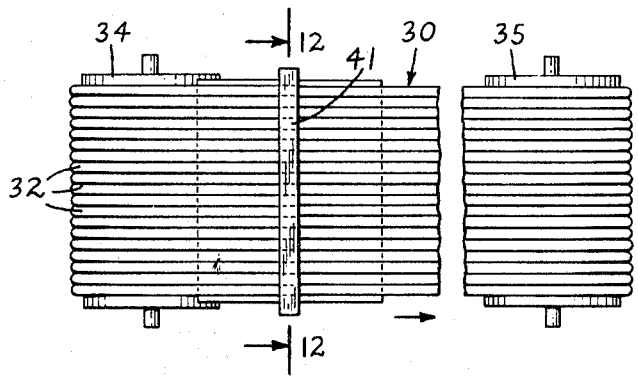
FIG.11.
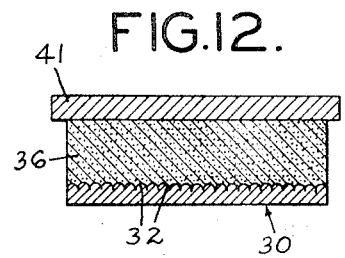
FIG.12.
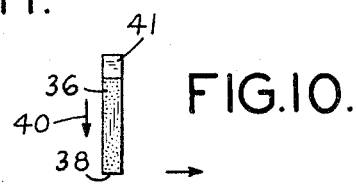
FIG.10.
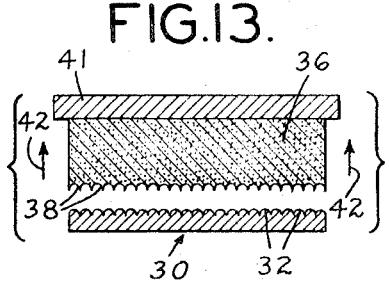
FIG.13.
FIG.17.
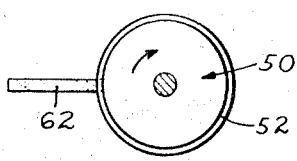
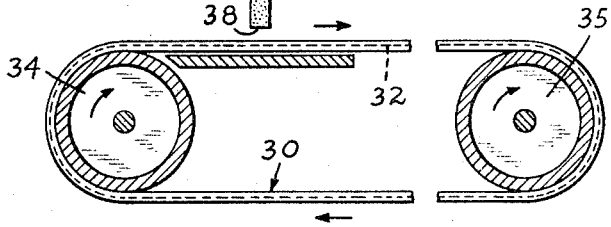
FIG.14.
FIG.18.
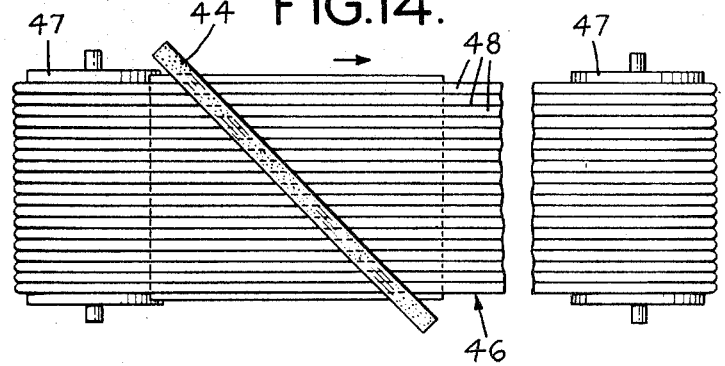
FIG.15.
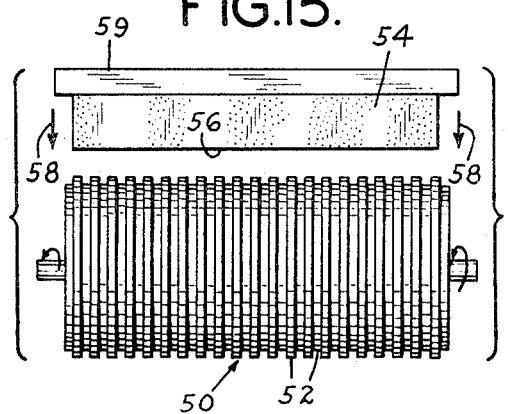
FIG.16.
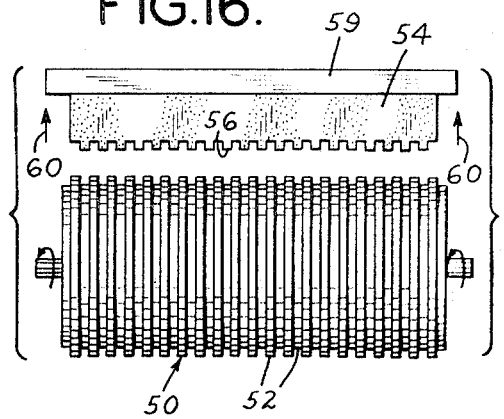

PATENTED JUL 27 1971 3,595,059

METHOD FOR SHAPING PRODUCTS MADE OF FOAM METAL BY PROGRESSIVE LOCALIZED CRUSHING OF FOAM STRUCTURE

BACKGROUND OF THE INVENTION

To make, by conventional machining techniques, a scraper or doctor blade which will accurately fit into the grooves and over the ribs of a grooved or ribbed surface of devices such as conveyor or processing belts having longitudinally extending parallel grooves and ribs or grooved press rolls for the wet press section of a papermaking machine, very close tolerances must be maintained in the manufacture of the belt or press roll as well as in the manufacture of the scraper or doctor blade. If the grooves or ribs were to be unequally spaced or nonuniform in depth or height the manufacture of an accurately fitting scraper or blade would present a very difficult and costly problem of "custom fitting."

BRIEF DESCRIPTION OF THE INVENTION

The method of the present invention makes it possible to accurately fit a metal part such as a wall, partition, scraper or doctor blade and the like to a ribbed or grooved surface which grooved or ribbed surface is not necessarily made up of accurately spaced ribs or grooves of uniform depth. Foam metal is used to make such metal part which can be made wholly from foam metal or which can be made partially from solid metal with a strip of foam metal attached thereto on the surface or along the edge which is to be fitted to the grooved or ribbed surface. The foam metal is progressively pressed preferably by means such as a rigid backing bar to apply uniformly distributed pressure against the ribbed or grooved surface to which it is to be fitted, with relative movement between the foam metal and the ribbed or grooved surface in a direction parallel with the ribs or grooves. Pressure is continued until the foam metal in the surface regions which are forced against the ribs or grooves crushes into a configuration accurately conforming with the profile of the ribs or grooves. The relative movement during the crushing procedure produces localized heat of friction and promotes densification of the foam metal in the surface regions and provides a desirable burnished finish of the surface of the crushed product.

The foam metal selected for use in this invention should have sufficient strength in compression, as well as in shear and tension, to perform the intended service, but yet should have sufficient ductility and low enough strength in compression as to be crushable in local regions only where forces and heat of friction are concentrated in the crush-forming procedure described above. Because of the thermal insulative nature of the metal foam structure the heat of friction remains localized and increases ductility of the metal in the regions where crush forming occurs.

DESCRIPTION OF THE DRAWINGS

FIG. 1 is a perspective view of a partially assembled container or tray made in accordance with the method of the present invention;

FIG. 2 is a vertical sectional view taken along the line 2-2 of FIG. 1;

FIG. 3 is a vertical sectional view taken along the line 3-3 in FIG. 1;

FIG. 4 is a diagrammatic elevational view illustrating a step in the manufacture of the product shown in FIG. 1;

FIG. 5 is a view similar to FIG. 4 showing a subsequent step;

FIG. 6 is a vertical sectional view taken along the line 6-6 of FIG. 5;

FIG. 7 is a view similar to FIG. 4 but showing a corresponding step in the manufacture of another part of the product shown in FIG. 1;

FIG. 8 is a view similar to FIG. 7 but showing a subsequent step;

FIG. 9 is a vertical sectional view taken along the line 9-9 of FIG. 8;

FIG. 10 is a diagrammatic elevational view illustrating a step in the manufacture of a doctor or scraper blade for use with an endless belt having a ribbed or grooved surface;

FIG. 11 is a plan view corresponding with FIG. 10;

FIG. 12 is a vertical sectional view taken along the line 12-12 in FIG. 11;

FIG. 13 is a vertical sectional view corresponding with FIG. 12 showing the parts in an exploded relationship;

FIG. 14 is a view similar to FIG. 11 but showing a step in a modified process embodying the present invention;

FIG. 15 is a diagrammatic elevational view illustrating a step in a further modification of the method of the present invention in which a doctor or scraper blade is to be fitted to an annularly grooved or ribbed roll;

FIG. 16 is a fragmentary view otherwise similar to FIG. 15 but showing a subsequent step in the process;

FIG. 17 is an end elevational view of a grooved or ribbed roll having a doctor or scraper blade made in accordance with the method of the present invention fitted thereto in operative relation;

FIG. 18 is a view similar to FIG. 17 but showing a modified form of doctor or scraper blade made in accordance with the present invention;

DESCRIPTION OF PREFERRED EMBODIMENTS

Figure 19:
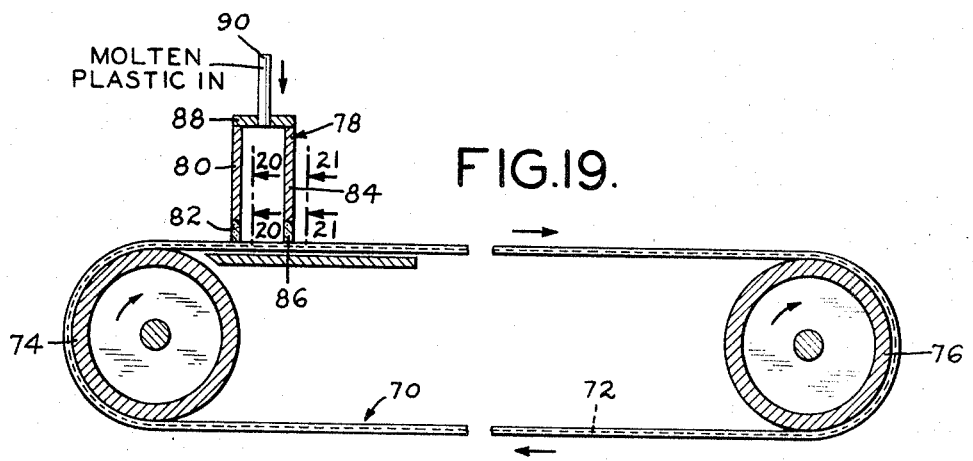
FIG. 19 is a view similar to FIG. 10 showing adaptation of the present invention to a plastic extruding device.

Referring now to the drawings in FIG. 1 there is shown an illustrative product of a static type which may be made in accordance with the present invention. The product comprises an open-top container or tray having a bottom 10 in the upper surface of which there are formed parallel alternating ribs and grooves 12, and an end wall 14 and a sidewall 16 secured in vertically extending relation to the bottom wall 10. It will be understood that to complete a container or tray an additional end wall and sidewall ordinarily will be provided but these additional walls have been omitted from FIG. 1 for clarity of disclosure. The bottom wall 10 may be made of some relatively hard rigid material such as metal, glass or suitable plastic material, in each case having the plurality of ribs, and grooves 12 mentioned above. While the ribs and grooves 12 may be evenly spaced and of uniform depth it is not necessary for the purposes of the present invention that this be the case. In fact one of the major purposes of the present invention is to provide accurate fits between two adjacent bodies even though the mating surfaces therebetween may be irregular and nonuniform in size and spacing.

In FIG. 2 it will be observed that the lower edge of the wall 14 makes an accurate fit with the contour of the alternating ribs and grooves 12. Since the end wall 14 extends transversely of the length of the ribs and grooves 12 the lower edge of the end wall 14 has formed therein alternating projections and notches which extend across the narrow dimension of the lower edge thereof.

In FIG. 3 it will be observed that the sidewall 16 also forms an accurate fit with the ribs and grooves 12. In the case of the sidewall 16 the lower edge thereof has formed therein longitudinally extending projections and recesses which match with the ribs and grooves 12 with which the wall 16 falls into contact.

From a consideration of FIGS. 1, 2 and 3 it will be readily appreciated that to achieve an accurate fit all the way across the width of the end wall 14 and all the way along the length of the sidewall 16 by ordinary machining methods it would be essential, from an economical standpoint, that the spacing, contour and depth of the alternating ribs and grooves 12 in the bottom wall be quite precisely uniform in order that mating surfaces could be formed with assurance of accurate fit. Assuming however that the bottom wall 10 is the product of some mass production procedure where tolerances are not high the task of making an accurate fit between the end walls 14, sidewalls 16 and the nonuniform surface of the bottom wall 10 would be expensive and difficult by ordinary machining operations.

The purpose of the present invention is to provide a simple, rapid and inexpensive method for making products, including a product of the type shown in FIGS. 1, 2 and 3, to achieve accurate fits between the mating walls even though the ribs and grooves in the bottom wall 10 may be quite nonuniform. To this end the end wall 14 and sidewall 16 are made from a foam metal of such density that they can be formed by crushing the lower edges thereof against the contour with which they are to be fitted.

In FIG. 4 an end wall 14 for a product such as that shown in FIGS. 1, 2 and 3, is shown in blank form, that is, the lower edge thereof is a plane surface such as would be formed by sawing the blank out of a flat sheet of foam metal of suitable density and thickness. As indicated by the arrow 18 in FIG. 4 the blank end wall 14 is pressed downwardly by use of a rigid backing bar 19 against the upper surface of the particular bottom wall 10 with which it is to be finally assembled. As indicated by the arrows 20 in FIG. 4 the blank 14 is then moved back and forth lengthwise of the grooves and ribs 12 formed in the bottom wall 10. Continued reciprocation in the direction of the arrow 18 will result in localized heating and crushing of the bubbles or walls of the foam structure of the blank 14 where pressure is concentrated. Therefore, at the beginning of such operation the lower edge of the blank 14 will start to assume the shape of the upper surfaces of the ribs 12. Continued reciprocation under pressure will eventually bring the lower edge of the blank 14 into contact with the bottoms of the grooves 12. When the wall 14 is raised in the direction of arrow 22 as indicated in FIG. 5, the blank 14 has formed therein a contour 15 which corresponds precisely with the contour of the ribs and grooves 12. Such contour 15 is shown in transverse section in FIG. 6.

The backing bar 19 may be permanently or temporarily attached to the foam structure 14 or it may form a rigid part of a power press, not shown. Preferably the rigid bar 19 is at least coextensive in area with the area of the upper surface of blank 14 so as to apply evenly distributed pressure to the blank.

The sidewalls 16 are prepared in accordance with the method illustrated in FIGS. 7 through 9. As shown in FIG. 7 a blank for the wall 16, made of suitable foam metal, is pressed downwardly as indicated by the arrows 24 by pressure applied through a rigid member or backing bar 25 and is reciprocated lengthwise as indicated by arrows 26 in a direction parallel with the ribs and grooves 12. Continued pressure and reciprocation will cause local crushing of the bubbles or wall structure of the foam metal and progressively the blank 16 may be moved downwardly until the bottom edge thereof reaches the bottoms of those grooves 12 against which it is being pressed and reciprocated.

In FIG. 8 the blank 16 has been moved upwardly away from the bottom wall 10 and the lower edge thereof has assumed a contour, indicated at 17, which corresponds with the contour of those ribs and grooves 12 against which it has been pressed. In FIG. 9, which is a transverse sectional view, the contour 17 is illustrated showing the manner in which it matches the ribs and grooves 12 against which the contour 17 has been formed.

For assembly of a container or tray such as shown in FIG. 1 it is only necessary to apply a suitable adhesive to the mating surfaces of the bottom wall 10 and the contoured lower edges of walls 14 and 16. Assuming that the bottom wall 10 and all sidewalls are made of metal or assuming that the bottom wall 10 is made of glass or suitable rigid plastic material, adhesives such as an epoxy resin or a silicone resin of the types now widely used for metal-to-metal, or metal-to-glass or plastic bonding may be used. Additional adhesive may be applied to the areas where the walls 14 and 16 overlap with one another at the corners of the container or tray. Obviously mechanical fastening elements, such as bolts, screws, clamps or rivets may be used instead of or in addition to the adhesive, illustratively disclosed above for assembling or supplementing the assembly of static structures of the type represented by the container or tray shown in FIGS. 1, 2 and 3.

The container or tray chosen for illustration in FIGS. 1, 2 and 3 is an illustration of a simple static structure which can be made by the method of this invention but it will be understood that the invention is adaptable to the forming of an accurate union between static elements of considerably more complicated contour. For example, partitions, bulkheads, instrument panels or the like or certain parts thereof made of foam metal may be fitted to concave or convex rigid walls even though the latter may have conduits, strengthening ribs and the like extending in parallel relationship. In all cases the rubbing back and forth of the foam metal blank upon the surface to which it is to be fitted will cause a desirable burnishing and densifying effect on and beneath the surfaces where crushing of the foam metal occurs.

The method of the present invention is also adaptable to the shaping of foam metal parts to accurately fit against surfaces in applications where relative movement occurs between such parts and surfaces in the intended use thereof. For example, scrapers or doctor blades may be shaped to fit against moving surfaces of belts or rolls for the purpose of scraping or wiping liquids or other materials from the latter. A specific application of the method of the present invention is disclosed in my copending application Ser. No. 840,679 filed July 10, 1969, wherein crush-contoured foam metal strips are utilized as the lips of an extruding nozzle where a molten plastic material is extruded upon a belt having a large number of parallel ribs of complicated contour. Simple examples will be disclosed herein to illustrate the adaptability of the present invention to the forming of accurately fitted relatively movable parts of the general types just discussed.

In FIGS. 10 and 11 there is shown an endless belt 30 having a plurality of alternating ribs and grooves 32 extending in parallel relationship lengthwise of the endless belt. The belt 30 is mounted for movement through an endless path upon spaced guide rolls 34 and 35 either one or both of which may be driven by suitable power means (not shown). A bar 36 made of suitable foam metal is shown in blank form in FIG. 10 and in such form it may have a plane edge surface 38, formed, for example, by sawing the bar 36 out of a sheet of foam metal of suitable thickness. As shown in FIG. 10 the foam metal bar 36 is pressed downwardly through a rigid member or backing bar 41 in the direction of the arrow 40 against the surface of belt 30 on which the ribs and grooves 32 are formed. Preferably this operation is performed while the rolls 34 and 36 are driven thereby continuously moving belt 30 through its endless path. Continued downward pressure upon the bar 36 under these conditions will cause progressive localized crushing of the bubbles or walls of the foam metal structure and eventually the lower surface 38 of bar 36 will reach the bottoms of the grooves 32 formed in the belt.

The continuous movement of belt 30 during the crushing procedure for shaping the lower edge 38 of the foam metal bar 36 will cause a desirable burnishing and densifying effect upon the surface regions of the foam metal as it is progressively forced to assume the contour established by the ribs and grooves 32.

In FIG. 12 the foam metal bar 36 is shown in place and accurately fitted to the ribs and grooves 32 of belt 30. In FIG. 13 the foam metal bar 36 has been raised away from the belt 30 in the direction of arrows 42 to show the new contour assumed by the lower edge surface 38.

The foam metal bar 36 thus contoured may be used as a lip for a nozzle of a plastic extruding device where it is desired to form a tight seal between the lip and the ribbed surface of belt 30. Also, the bar 36 when thus used may be raised from the surface of the belt 30 so as to form a downstream extruding nozzle lip which will permit the extrusion of a continuous strip of plastic material which conforms to the longitudinally ribbed contour of the lip and belt surface Furthermore, after the bar 36 has been contoured as described above it may be further contoured, as by flattening or cutting off the high points of the contour thus permitting extrusion of plastic material in the form of parallel strips lying in the bottoms of the grooves 32 of belt 30.

The foam metal bar 36, contoured as shown in FIGS. 12 and 13 also may be used as a scraper or doctor blade for removing liquids or other materials from belt 30. For this purpose the bar 36 may be held against the belt 30 in any position along the endless path thereof, for example it may be pressed upwardly against the lower reach of belt 30 to remove, or to complete the removal of some material carried by belt 30.

In FIG. 14 there is shown a modification of the manner of contouring a foam metal bar 44 to match the surface of a continuously moving belt 46 mounted on spaced guide rolls 47. In this modification the foam metal bar 44 has been pressed downwardly against the ribbed and grooved surface 48 of belt 46 with the bar 44 disposed at an angle to the longitudinal path of movement of belt 46. The contour thus imparted to the lower edge surface of bar 44 will be similar to that imparted to the bar 36 as shown in FIG. 13 except that the grooves thus crush formed in the bar 44 will extend angularly across the lower surface thereof. Such angularly disposed bar 44 may serve as a scraper to remove some liquid or other flowable material from the surface 48 of belt 46 and because of its angular disposition will discharge such material over the lower edge (as viewed in FIG. 14) of the belt 46.

In FIGS. 15 through 18 there is shown a method for making a scraper or doctor blade for cooperating with a roll having alternating ribs and grooves. Rolls of this type have many uses where scraping or doctoring is required. For example in the wet press section of a papermaking machine a papermakers' felt with a freshly laid web of paper thereon is frequently guided into the nip between such a grooved roll and a smooth press roll where water is squeezed out of the system of felt and paper web. In such wet pressing the grooved roll affords passageways for exit of the water which sometimes flows backwardly down the rising face of the grooved roll or sometimes flows forwardly down the retreating surface thereof. In either event it may be desirable to provide a doctor blade which must fit closely into each of the grooves as well as on the top of each rib of the grooved press roll in order to remove water which otherwise may tend to adhere to the surfaces of grooves and ribs. Since such press rolls frequently have great axial length for manufacture of wide webs of paper the rolls are customarily crowned to compensate for sagging. The manufacture of a doctor blade for such rolls by ordinary machining processes is difficult and expensive. The present invention affords a process for economical and rapid manufacture of accurately fitting doctor blades for such use.

In FIG. 15 a roll 50 is shown having alternating ribs and grooves 52. A doctor blade blank comprising a bar 54 of foam metal of suitable density is shown as having a lower edge 56 which is a plane as would be formed by sawing such bar from a sheet of foam metal of suitable thickness. The roll 50 is put into rotation about its axis and the bar 54 is then progressively pressed through a rigid member or backing bar 59 in the direction of arrows 58 against the ribbed and grooved surface to crush form the edge surface 56 thereof into conformity with the surface of the roll as described above in preceding modifications. When the edge 56 reaches the bottoms of the grooves 52 contouring is completed and, as shown in FIG. 16, removal of the contoured bar 54 in the direction of arrows reveals the newly contoured edge 56.

When it is desired to have a doctor blade 62, thus crush-formed from a bar 54, press against the roll 50 in a radial direction, as shown in FIG. 17, the crush-forming procedure just described will be carried out by progressively pressing the blank bar 54 in a radial direction with respect to the roll 50. When it is desired to have a doctor blade 64, thus crush-formed from a bar 54, press against the roll 50 at an angle other than radial, as shown in FIG. 18, the blank bar 54 will be progressively pressed against the roll 50 at an appropriate angle during the crush-forming step. In some instances it may be desirable to taper or bevel the lower edge 56 of blank 54 so as to reduce the area of metal to be crushed during the early stages, at least, of the crush-forming procedure, thus to facilitate formation of deep notches in the blank.

The use of doctor blades made by the process of the present invention with grooved rolls, such as grooved wet press rolls discussed above, not only affords economy in the manufacture of the blades but also makes it practical to use less expensive machining techniques in the manufacture of the grooved press roll itself. That is, the grooves formed in such rolls need not be held to close tolerances in spacing, width or depth inasmuch as the crush-formed doctor blade will form an accurate fit with the roll in spite of dimensional variations of such magnitude as would make manufacture of doctor blades by conventional techniques impractical.

For the manufacture of any of the crush-formed products illustratively disclosed herein the foam metal will be selected as to type of metal or alloy, density and whether it is nonporous or is porous on the basis or requirements for end use. For static structures corrosion resistance, and compressive, tensile and shear strengths will be major factors as, perhaps, will be the ratio of weight to such strengths in the case of structures for use in land, air or space vehicles. For use with relatively moving parts the factors above will be important plus the bearing characteristics of the selected foam metal with the particular metal used for the rigid metal parts. In the latter respect, for example, alloys containing copper, nickel, zinc, lead or the like may be used where sliding or rotative contact is required with a rigid ferrous metal part.

In the selection of the foam metal to be used in any specific application an important consideration is to select such a metal which has adequate strength in compression to preclude the possibility of further crushing under the maximum compressive loading to which the crush-formed product will be subjected in service. Thus, preferably, a metal is selected which will crush under a pressure somewhat higher than the maximum service pressure and such metal is then crush-formed in accordance with this invention by application of such higher pressure. In that operation the bubbles or walls of the foam structure will be distorted under forces exceeding the elastic limit of those bubbles or walls in the local zones of distortion and will thereafter maintain the new shape imparted by such distortion without further crushing under maximum service loading conditions. The compressive strength of foam metals is largely determined by the ductility of the metal and upon the density of the foam structure. Thus in a general sense the selection for particular service loadings may be made on the basis of the density of a foam made of a particular metal.

A further consideration in the selection of a foam metal is whether it should be porous, that is, a sponge structure with air in continuous phase, or nonporous wherein the structure is made up of closed bubbles with metal in continuous phase. For use as extruder nozzle lips or for forming leakproof containers or trays the metal should be nonporous. For use as a doctor blade or scraper the porosity or nonporosity may not be critical, depending on what is being doctored or scraped off and depending upon whether imbibing of a liquid such as water, for example, by a porous blade would be objectionable in a particular instance. Porous foam metal will be used in any instance where the metal is to perform a filtering or similar function. Either type of foam metal will readily collapse for crush-forming under sufficient localized crushing force. The sponge structures will collapse by bending of adjacent walls into contact with one another. The closed foam structure will collapse as a result of collapse of the closed bubbles which contain air or other gas at very low gaseous pressure at room or other temperatures which are substantially lower than the temperature at which the molten metal was made into a foam.

Products made by the process of the present invention need not be integral units as shown in the simple embodiments illustrated in the drawings. In all cases the foam metal may be mechanically or adhesively secured or welded to rigid strengthening or backing members as is illustrated in the extruder nozzle lips shown in said copending application Ser. No. 840,679. Also, for example, the doctor blades for grooved wet press rolls as shown in FIGS. 15—18 of the present drawings may be required in very great lengths to fit a wide papermaking machine and in any such case the length may be provided by securing a plurality of shorter sections in lengthwise relationship to each other and/or to a suitable metal backing bar, beam or other rigid structure.

In all of the illustrations herein of the method of the present invention it is important that at least during the final stages of the crush-forming procedure the foam metal blank should be pressed in an accurately linear direction against the surface of the rigid body to which the blank is to be fitted. In FIG. 4, for example, the blank 14 could be slanted towards the left or right in the early stages of the crush-forming procedure for rapid starting of the crushing due to high concentration of pressure on relatively small areas, but at the final stages it should be straightened up to vertical position so that the crushed contour of the blank will fit squarely with the ribs and grooves 12 of the bottom wall 10. This same consideration applies to the handling of the blank 36 shown in FIGS. 10 through 13 and the blank 54 shown in FIGS. 15 through 18. The direction of the line which must be accurately established in the final forming stages need not be truly perpendicular to the general plane of the surface of the rigid body, for example, it may be desired to have certain of the walls 14 and 16 in FIG. 1, or to have the scraper or doctor blades 36 of FIG. 10 or 44 of FIG. 14, slant forward or backward relative to the direction of movement of the belts 32 or 46 respectively. In such event the blanks will be finally shaped in the desired angular position relative to the surface to which they are being fitted. Alternative final angular relationships have been disclosed above in connection with the fitting of a doctor blade 54 to a grooved roll 50 in FIGS. 15 through 18.

Obviously, also, the blanks should not be permitted to move transversely of ribs and grooves of the surfaces to which they are being fitted in accordance with the present invention.

No means for holding the foam metal blanks 14, 16, 36, 44, 62 or 64 has been disclosed herein inasmuch as the simple guiding apparatus required for this purpose may take any form which would readily occur to a skilled mechanic. In many cases the supporting structure for holding a scraper or doctor blade in operative position during actual use may also be availed of to hold and guide the foam metal blank during the crush-forming procedure which will precede such actual use.

A particular advantage of the crush-formed products made by the present invention is that the foam metals used herein have a certain amount of inherent resilience which will differ between foam metals made with different densities or different wall thicknesses of bubbles or sponge, and/or made of different metals or metal alloys. In many cases therefore it is possible to make an accurate fit of a foam metal piece having a particular coefficient of thermal expansion with a rigid piece having a different coefficient of thermal expansion with assurance that the fit between such piece will remain accurate over a relatively wide range of temperatures. In other cases it may be desirable to preheat the foam metal blank and the belt or other structure to which the blank is to be fitted, to about the temperature at which the fitted parts will operate in service.

In FIGS. 19 through 25 there is illustrated a specific embodiment of the method of the present invention which is identical, insofar as the method is concerned, with the method disclosed but not claimed in my U.S. application Ser. No. 840,679 aforesaid. Thus in FIG. 19 there is shown an endless belt 70 having parallel conformations in the outer surface which comprise alternating ribs and grooves 72. The belt 70 is guided around spaced rolls 74 and 76, either one or both of which may be driven to impart movement to the belt 70 in the direction of its length. An extruder nozzle 78 comprises an upstream vertical wall 80 having a lip 82 made of foam metal in accordance with the method of the present invention. The nozzle 78 also has a downstream vertical wall 84 having a nozzle lip 86 made of foam metal in accordance with the method of the present invention. The nozzle 78 is closed at the top by a horizontal wall 88 and is provided with an inlet conduit 90 to which molten plastic material is supplied under pressure for the formation of molded and extruded shapes in and upon the surfaces of the ribs and grooves 72 of belt 70.

Figure 20:
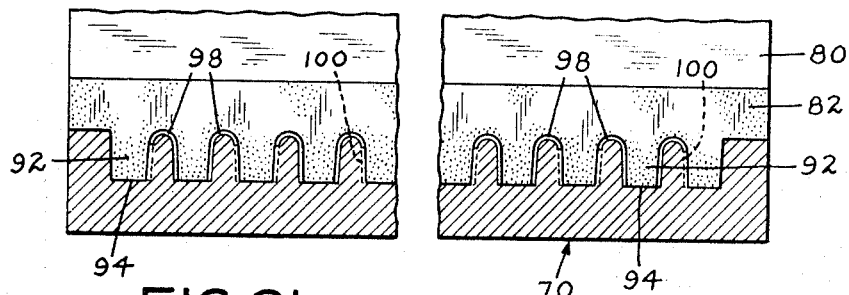
FIG. 20 is a vertical sectional view taken on the line 20-20 in FIG. 19.
Figure 21:
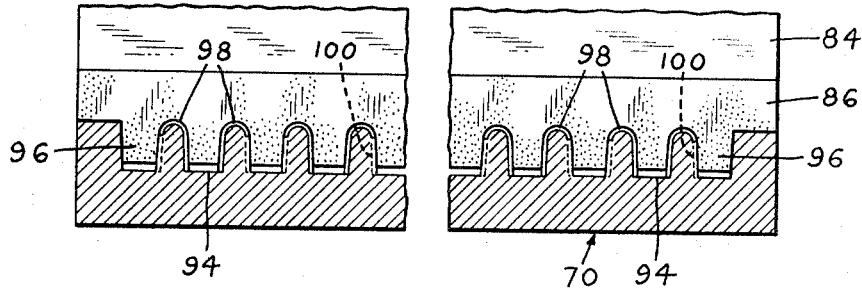
FIG. 21 is a vertical sectional view taken along the line 21-21 in FIG. 19.

In FIG. 20 the upstream wall 80 and nozzle lip 82 are shown in engagement with the ribbed and grooved surface 72 of the belt 70. The lip 82 is made of foam metal and it will be observed that the lower edge of the lip 82 has formed thereon projections 92 which extend into and fit accurately with the surfaces of the grooves extending all of the way to the bottoms 94 thereof. The projections 92 are separated by notches which accurately fit over the upper surfaces of ribs in belt 70. This accurately filling contour between the lip 82 and belt 70 will prevent the flow of molten plastic material upstream of the belt 70, in other words, the lip 82 serves as a sealing gasket for the upstream side of the nozzle 78. Between the upstream lip 82 and the downstream lip 86 the rib and groove surface of belt 70 is in direct contact with the molten plastic material supplied to the interior or nozzle 78. In FIG. 21 the downstream wall 84 and lip 86 of nozzle 78 are shown in the relation which they bear with the belt 70. It will be noted that the projections 96 of the lip 86 do not extend all of the way to the bottoms 94 of the grooves in the upper surface of belt 70. However it will be noted that the remainder of the projections 96 and the notches between adjacent projections fit accurately upon the walls of the grooves and over the top of the ribs of belt 70. Thus the latter accurately fitting parts will serve to scrape the plastic material from the surfaces of the ribs with which the projections come in contact. Further, since each projection 96 terminates short of the bottoms 94 of the grooves a shallow horizontally disposed extruding space is defined whereby the plastic material supplied to the interior of nozzle 78 is permitted to flow out beneath the lip 86 in the form of separate ribbons formed in the bottom of each of the grooves in the surface of belt 70.

Figure 22:
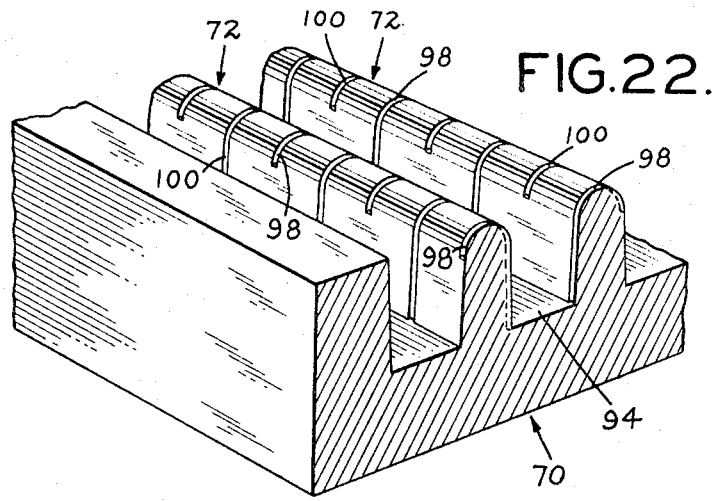
FIG. 22 is an enlarged fragmentary view of the belt shown in FIG. 19.

Referring now to FIG. 22, which is a greatly enlarged isometric fragmentary view of the belt 70, it will be observed that each of the ribs of the belt surface 72 has formed therein a series of shallow troughlike depressions 98 and 100. These depressions 98 and 100 are molding recesses for receiving and retaining molten plastic material as the belt proceeds through nozzle 78 and emerges from beneath the downstream lip 86. The molding recesses 98 and 100 communicate at their lower ends with the bottom surface 94 of each of the grooves in belt 70 whereby the plastic shapes which are molded in the recesses 98 and 100 will be integral with the plastic ribbons which are extruded into the bottoms of the grooves.

The molding recesses 98 and 100 illustratively have been shown in FIG. 22 as defining spaces in which hooks will be molded from the plastic material. That is, the recesses 98 in any one groove extend upwardly from the bottom wall 94 and then continue upwardly and away from each other to extend over the tops of the ribs on each side of said one groove, and they terminate in a blind end substantially removed above the level of the bottom of the next adjacent groove. Also it will be noted that the molding recesses 100 communicate with the bottom walls 94 of the two grooves adjacent said one groove and extend upwardly and over the ribs and terminate well above the bottom 94 of said one groove, thus to form hooks which face toward one another relative to the bottom 94 of said one groove. The final molded product produced by extrusion and molding on the belt 70 in FIG. 22 will be a series of parallel flat ribbons of extruded plastic material having integrally formed therewith a multiplicity of generally vertically disposed molded plastic hooks which face in alternating relation with one another over the space lying between adjacent extruded ribbons. This particular product is intended to be assembled with a flexible backing sheet to form the hook part of a hooknand-loop fastener all as disclosed in greater detail in U.S. application Ser. No. 840,679.

Figure 23:
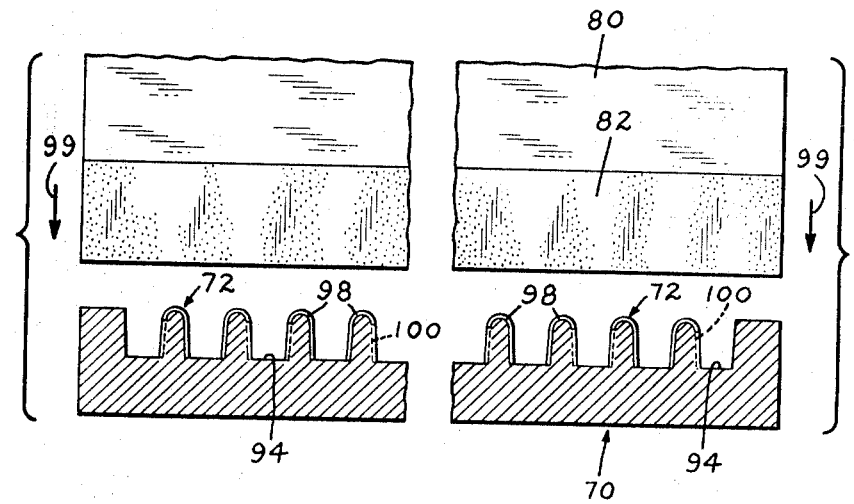
FIGS. 23, 24 and 25 are views similar respectively to FIGS. 20, 21 and 22 but showing adaptation of the method of the present invention to formation of extruder nozzle lips.
Figure 24:
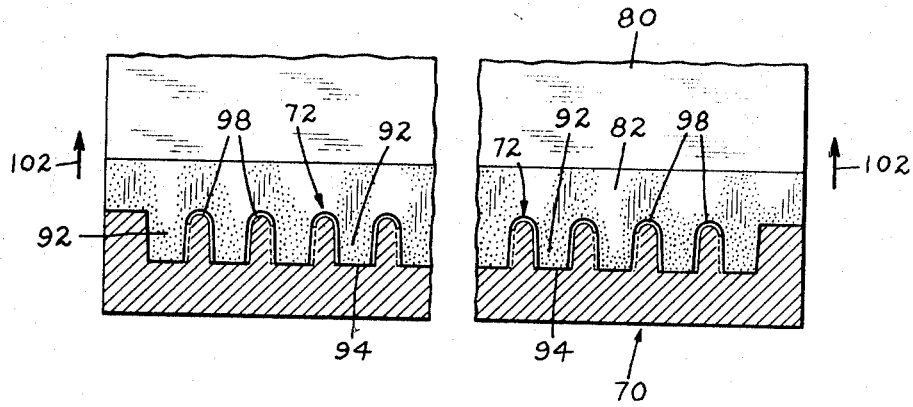
Figure 25:
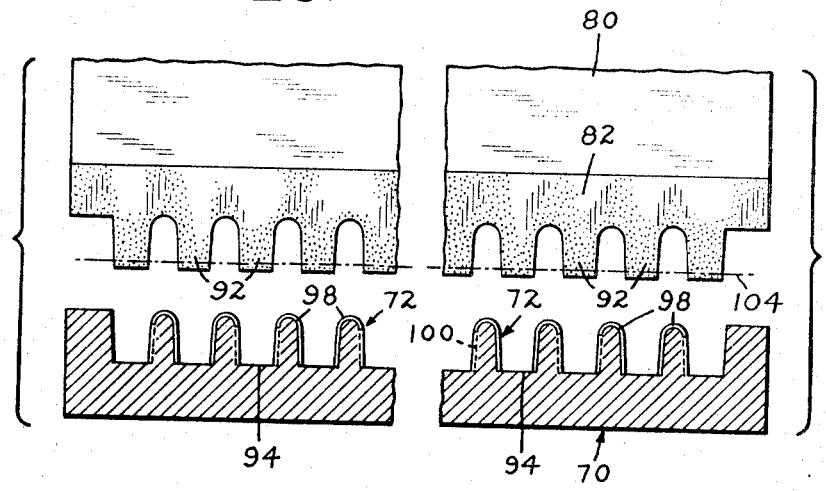

The method for forming the nozzle lips 82 and 86 is illustrated in FIGS. 23, 24 and 25. In FIG. 23 the nozzle lip 82 is shown in blank form secured to the rigid upstream wall 80 of the nozzle 78. The particular belt to which the nozzle lip 82 is to be conformed in shape is then set in motion, with or without preheating as noted above, by the driving means mentioned above and the assembly of wall 80 and foam metal blank 82, preheated or not as desired, is pressed downwardly as indicated by the arrow 99 against the rib and groove surface of belt 70. Such pressure, with the belt moving in sliding relationship with the lip blank 82 is continued until, as shown in FIG. 24, the lower edge surface 100 of the lip blank 82 reaches the bottoms 94 of the grooves in belt 70. The crushing of the foam structure and burnishing of the surface portions thereof which are rubbed against the belt 70 will take place as described in connection with other embodiments of the present invention. When this condition is reached the wall 80 and the now finally contoured upstream lip 82 is moved upwardly as indicated by the arrow 102 into the position shown in FIG. 25 and later is assembled with the machine as shown in FIG. 19.

For the formation of the downstream lip 86 (FIG. 21) in accordance with the present invention, the procedure just described in connection with lip 82 is followed all the way to the finally contoured condition illustrated in FIG. 25. However since the projections 96 of the lip 86 are not to touch the bottoms 94 of the grooves in belt 70 the projections 92 as shown in full lines on the lip 82 in FIG. 25 are ground or cut off along the broken line 104 shown in FIG. 25. The amount of foam metal removed by this operation is so chosen as to afford an extrusion place above the bottoms 94 of the belt grooves sufficient for the forming of the extruded plastic ribbons mentioned above with such thickness as is required.

The advantages of employment of the present method for the production of the nozzle lips 82 and 86, as described, are similar in all respects to those discussed above in other embodiments of this invention. In particular, the inherent resiliency of the foam metal from which these lips are formed is of substantial value since the molten plastic material is supplied to nozzle 78 under a considerably elevated temperature at which the different coefficients of thermal expansion of the belt 70 and lips 82 and 88 respectively become important. Thus, for example, it is possible to maintain the nozzle 78 in full engagement with the belt 70 at room temperature when no molten plastic material is in the nozzle 78 and to leave it in such contact while molten plastic material is supplied to the nozzle 78.

A particular advantage of the method of the present invention when applied to the formation of the nozzle lips 82 and 86 will be appreciated from a consideration of FIG. 22. The molding recesses 98 and 100 which are sunk into the walls of the ribs and grooves 72 of belt 70 will be progressively dragged through the foam metal blanks while the latter are being crushed formed in accordance with the process described above. Thus the foam metal will not enter or, at least, will not remain in any of the molding recesses 98 or 100 and the final shape imparted to the nozzle lips will be exactly the same as if there were no molding recesses formed in the ribs and grooves of the belt 70. The sliding friction between the surfaces of the ribs and grooves 72 lying between successive molding recesses 98 and 100 will afford the desirable burnishing and densification of the surface regions of the foam metal blank whereby the finally contoured nozzle lips will have smooth surfaces to span the open sides of molding recesses 98 and 100.

Referring now to FIG. 22 it will be evident that the molding recesses 98 and 100 instead of terminating as shown to form molded hooks could be extended down to the bottoms 94 of both adjacent grooves, thereby providing for the molding of loops joined to both adjacent extruded ribbons of plastic material formed on the bottoms 94. Also, some of the recesses 98 and 100 may be in the form shown in FIG. 22 to provide molded hooks and others may be extended down to both adjacent bottoms 94 so that the molded product will have a mixture of hooks and loops.

For the extruder lips 82 and 86 just described in connection with FIGS. 19 through 25 a very fine-grained foam metal, preferably of the nonporous type may be used. By "fine-grained" is meant that the closed bubbles of the foam structure are very small in diameter. The reason for this preference is that for the manufacture of molded plastic fastener elements of the hook-and-loop type the belt conformations such as ribs and grooves 72 of belt 70 will have heights or depths of only a few hundredths of an inch and the depth of the molding recesses will be only a few thousandths of an inch. (A typical commercial hook-and-loop fastener sold under the Registered Trademark "Velcro" has hooks about 0.06 inch high made of monofilaments having a cross-sectional diameter of about 0.008 inch.) It will be evident that it is preferable for the bubbles of the foam metal structure to be small enough that a relatively large number of them will be crushed when the nozzle lips are crush shaped to conform to ribs and grooves of such dimensions. Also, the crushed bubbles should be small enough to form a smooth burnished surface to span the tiny molding recesses 98 and 100.

Alternatively a coarser foam metal of the porous type may be crush-formed to conform to a belt such as belt 70 with small ribs and grooves and the crush-formed structure thereafter impregnated with a suitable hardenable plastic material, stable at temperature of the molten plastic supplied by nozzle 78. Impregnation may be complete or limited to surface regions of the foam structure as desired.

For the manufacture of doctor blades for a wet press roll having a surface conformation which is grooved, as described above in connection with FIGS. 15 through 18 a coarser, larger bubble, foam metal may be used because the grooves in roll 50 may be as much as 0.25 inch to 0.50 inch deep. If an open porous foam is used for such doctor blades it may be impregnated wholly or in surface regions only, after crush-forming in accordance with the present invention, with a hardenable plastic material to make the final product nonporous if so desired.

The tensile, shear or compressive strength of an open, porous foam metal chosen because it can be easily crush shaped in accordance with the present invention, may not be great enough for the intended service of the shaped piece. In such event the shaped piece may be impregnated, wholly or in the surface regions only, with a hardenable plastic material to give the final product improved strength characteristics. This procedure may be followed in the production of any of the examples disclosed herein by the method of the present invention. Instead of hardenable plastic material such as thermoplastic or thermosetting resins the foam may be impregnated with any pore closing material suitable for the end use of the product, for example molten or powdered metal, waxes or greases of natural or synthetic types, as well as plaster, cement and the like.

Foam metals frequently are cast in chilled molds with the deliberate intention of forming a continuous or substantially continuous skin of nonfoamed metal on the surfaces of the casings which come in contact with chilled mold walls. For the purposes of the present invention it usually is desirable to remove any such skin from at least that surface of a foam metal blank which is to be crush shaped as disclosed herein. Any such skin which has substantial thickness or continuity would have to be stretched or broken in the practice of the present method and when the desired contour includes notches or grooves of substantial depth the forces required for such stretching or breaking possibly could require the application of pressure exceeding the ultimate compressive strength of the foam structure in regions remote from the regions in which crushing is intended to occur during the crush-forming procedure. In the absence of any such skin the localized heat of friction so increases ductility of the metal that crush forming can be practiced without any danger of applying pressure approaching or exceeding the compressive strength of the relatively cooler regions remote from the surface regions where crush forming is taking place.

In all of the examples disclosed above the foam metal blank has been crush formed to conform completely with the shape of the rigid body. That is, the crush-forming procedure has been continued until the affected edge regions of the foam metal blank project all the way to the bottoms of the grooves in the rigid body. Such procedure is illustrated in FIG. 25, for example, even though it may be desired to shorten the projections 92 by cutting or guiding along the plane indicated by the broken line 104. This is preferable when a precise amount of shortening of projections 92 is required. However, it will be apparent that a similar result may be achieved by terminating the crush-forming procedure before the lower edge of the blank 82 reaches the bottoms 94 of the grooves. This same consideration applies to any of the examples herein in the event complete conformity is not desired or essential. Therefore, the words "conforming" or "bringing of the foam structure into conformity with" as used in describing or claiming of the present invention are not intended to be limited to complete conforming or conformity. Similarly such words are not intended to be limited to the precise conformity such as would produce the uniform sliding fit which is desirable in many applications. It may be desired in other applications to provide a somewhat loose fit and this may be accomplished by the method of the present invention, for example by reciprocating the blank 54 in FIG. 16 a small distance to the right and left while the crush-forming procedure is being carried out.

What I claim is:

1. Method for shaping regions of a foam metal body adjacent one surface thereof to conform to the shape of a surface of a body of rigid material wherein said last-named surface has formed therein a plurality of parallel conformations such as ribs and grooves, comprising progressively pressing said one surface of said foam metal body against said surface of said body of rigid material while causing relative sliding movement between said foam metal body and said body of rigid material in a direction parallel with said parallel conformations, thereby to cause progressive collapse of the foam structure of said foam metal body into shape conformity with said conformations only in localized regions of said foam metal body adjacent the areas of contact between said one surface of said foam metal body and said conformations.

2. Method in accordance with claim 1 in which said body of rigid material is an endless belt having ribs and grooves formed in a surface of said belt, said ribs and grooves extending parallel with the length of said belt, and wherein said relative sliding movement is effected by driving said belt lengthwise through an endless path while said foam metal body is pressed against the surface of said belt in which said ribs and grooves are formed.

3. Method in accordance with claim 1 in which said body of rigid material is a cylindrical roll having ribs and grooves formed in the cylindrical surface of said roll, said ribs and grooves extending circumferentially of said roll, and wherein said relative sliding movement is effected by rotating said roll about the cylindrical axis thereof while said foam metal body is pressed against the surface of said roll in which said ribs and grooves are formed.

4. Method in accordance with claim 1 in which the pressing of said one surface of said foam metal body against said surface of said body of rigid material is effected by pressure exerted upon said foam metal body through a rigid backing member which engages said foam metal body over an area at least substantially coextensive with the area of said one surface of said foam metal body.

5. Method in accordance with claim 2 in which the pressing of said one surface of said foam metal body against said surface of said body of rigid material is effected by pressure exerted upon said foam metal body through a rigid backing member which engages said foam metal body over an area at least substantially coextensive with the area of said one surface of said foam metal body.

6. Method in accordance with claim 3 in which the pressing of said one surface of said foam metal body against said surface of said body of rigid material is effected by pressure exerted upon said foam metal body through a rigid backing member which engages said foam metal body over an area at least substantially coextensive with the area of said one surface of said foam metal body.

7. Method for shaping regions of a foam metal body adjacent one surface thereof to conform to the shape of a surface of a body of rigid material wherein said last-named surface has formed therein a plurality of parallel ribs and grooves, comprising progressively pressing said one surface of said foam metal body against said surface of said body of rigid material while causing relative sliding movement between said foam metal body and said body of rigid material in a direction parallel with said parallel ribs and grooves, thereby to cause progressive collapse of the foam structure of said foam metal body only in localized regions of said foam metal body adjacent the areas of contact between said one surface of said foam metal body and said ribs and grooves, and continuing said step of progressively pressing until portions of said one surface of said foam metal body come into contact with the bottoms of the grooves in said body of rigid material, thereby forming in said foam metal body a plurality of notches and projections conforming respectively with said ribs and grooves in said body of rigid material.

8. Method in accordance with claim 7 wherein said foam metal body having said notches and projections formed therein is taken out of contact with said body of rigid material and a predetermined amount of the foam metal of said foam metal body is then removed from the ends of at least some of said projections to afford a final fit between said foam metal body and said surface of said body of rigid material wherein a space is provided between the ends of those of said projections from which said predetermined amount of foam metal is removed and the bottoms of said grooves corresponding therewith.